(12) United States Patent
Schulze Selting et al.

(10) Patent No.: US 12,415,387 B2
(45) Date of Patent: Sep. 16, 2025

(54) ROTARY TRANSMISSION APPARATUS FOR THE TRANSMISSION OF CONTROL AND/OR WORKING PRESSURES TO A FLUID DUCT IN THE INTERIOR OF A SHAFT

(71) Applicant: ILLINOIS TOOL WORKS INC., Glenview, IL (US)

(72) Inventors: Bruno Schulze Selting, Rielasingen-Worblingen (DE); Martin Spindler, Herdwangen-Schönach (DE)

(73) Assignee: Illinois Tool Works Inc., Glenview, IL (US)

( * ) Notice: Subject to any disclaimer, the term of this patent is extended or adjusted under 35 U.S.C. 154(b) by 981 days.

(21) Appl. No.: 17/608,552

(22) PCT Filed: May 8, 2020

(86) PCT No.: PCT/US2020/032084
§ 371 (c)(1),
(2) Date: Nov. 3, 2021

(87) PCT Pub. No.: WO2020/231805
PCT Pub. Date: Nov. 19, 2020

(65) Prior Publication Data
US 2022/0227187 A1 Jul. 21, 2022

(30) Foreign Application Priority Data
May 10, 2019 (DE) ..................... 10 2019 112 320.8

(51) Int. Cl.
*B60C 23/00* (2006.01)

(52) U.S. Cl.
CPC .. *B60C 23/00354* (2020.05); *B60C 23/00363* (2020.05); *B60C 23/00318* (2020.05); *B60C 23/00347* (2020.05); *B60C 23/0039* (2020.05)

(58) Field of Classification Search
CPC ........ B60C 23/00336; B60C 23/00354; B60C 23/00363; B60C 23/003
See application file for complete search history.

(56) References Cited

U.S. PATENT DOCUMENTS

| 5,253,688 | A   |   | 10/1993 | Tigges |              |
|-----------|-----|---|---------|--------|--------------|
| 8,869,850 | B2  | * | 10/2014 | Stech  | B60C 23/0039 |
|           |     |   |         |        | 152/417      |

(Continued)

FOREIGN PATENT DOCUMENTS

| DE | 31 20 115    | A1 |   | 12/1982 |            |
|----|--------------|----|---|---------|------------|
| DE | 102007027147 | A1 | * | 12/2008 | B60C 23/003 |

(Continued)

OTHER PUBLICATIONS

European Patent Office (EPO), Rijswijk, NL, International Search Report, Form PCT/ISA/210 for International Application No. PCT/US2020/032084, Aug. 4, 2020 (2 pp.).

(Continued)

*Primary Examiner* — S. Joseph Morano
*Assistant Examiner* — Alex Palmer
(74) *Attorney, Agent, or Firm* — McAndrews, Held & Malloy, Ltd.

(57) ABSTRACT

A rotary transmission apparatus (1) for the transmission of control and/or working pressures to a fluid duct (51) which is received or configured at least in regions in the interior of a shaft (50), in particular, a drive shaft. The rotary transmission apparatus (1) has a stator assembly (2) which is arranged in a stationary manner with respect to a rotational movement of the shaft (50) and has at least one fluid feed/discharge line (3) and a control element (4) which can be displaced in the shaft longitudinal direction (L) relative to the shaft (50) between a first position and a second position. A flow connection between the at least one fluid feed/discharge line (3) and the fluid duct (51) is interrupted in the (Continued)

first position of the control element (4), and a flow connection between the at least one fluid feed/discharge line (3) and the fluid duct (51) is established in the second position of the control element (4).

18 Claims, 7 Drawing Sheets

(56) References Cited

U.S. PATENT DOCUMENTS

| | | | |
|---|---|---|---|
| 2005/0000758 A1 | 1/2005 | Tarasinski et al. | |
| 2009/0283191 A1* | 11/2009 | Isono | B60C 23/127 |
| | | | 152/419 |
| 2014/0363271 A1 | 12/2014 | Wagemann | |
| 2016/0009148 A1 | 1/2016 | Berkness | |
| 2018/0215201 A1* | 8/2018 | Balistreri | B60C 23/00381 |

FOREIGN PATENT DOCUMENTS

| | | |
|---|---|---|
| DE | 102009057158 A1 | 6/2011 |
| DE | 202011051737 U1 | 11/2011 |
| EP | 2818336 A1 | 12/2014 |
| WO | 02081235 A1 | 10/2002 |
| WO | 2008095470 A1 | 8/2008 |
| WO | 2017076849 A1 | 5/2017 |
| WO | 2018082995 A1 | 5/2018 |

OTHER PUBLICATIONS

European Patent Office (EPO), Munich, DE, Written Opinion of the Int'l Searching Authority for Int'l Appln No. PCT/US2020/032084, Form PCT/ISA/237, Aug. 4, 2020 (7 pp.).

Notice of Reasons for Rejection dated Jan. 25, 2024 (mailed Feb. 6, 2024), for Japanese Patent Application No. 2021-566052 (2 pages).

Yuanqing Ye, "Combined Sealed Swivel Joint", p. 54-56, China Rubber/Plastics Technology and Equipment, 02, Apr. 30, 1994 (A type reference) (3 pages).

* cited by examiner

ROTARY TRANSMISSION APPARATUS FOR THE TRANSMISSION OF CONTROL AND/OR WORKING PRESSURES TO A FLUID DUCT IN THE INTERIOR OF A SHAFT

CROSS REFERENCE TO RELATED APPLICATION

This application is a National Phase filing of PCT International Patent Application PCT/US2020/032084, filed on 8 May 2020, which claims the priority of German Patent Application DE 10 2019 112 320.8, filed 10 May 2019.

These applications are hereby incorporated by reference herein in their entirety and is made a part hereof, including but not limited to those portions which specifically appear hereinafter.

The present invention generally relates to a system for transmitting control and/or working pressures or pressurized mediums, particularly in a drive shaft with a vehicle tire mounted on it in rotary fashion. According to the embodiments of the invention, it particularly relates to a rotary transmission apparatus for transmitting control and/or working pressures or pressurized mediums to a fluid duct which is received or configured at least in regions in the interior of a shaft, in particular a drive shaft.

According to another aspect, the invention relates to a system with such a rotary transmission apparatus and a shaft on which the rotary transmission apparatus is mounted, the shaft particularly being embodied as a drive shaft of a vehicle.

The invention also relates to a tire pressure adjusting system for at least one wheel, which is driven rotationally relative to a vehicle body, of a pneumatically wheeled vehicle having at least one drive shaft for driving the wheel, with a fluid duct being received or configured in the interior of the drive shaft, and with at least one rotary transmission apparatus being provided for feeding and/or discharging a pressurized fluid as required to and from the fluid duct received or configured in the interior of the drive shaft.

Vehicle tires are usually filled with compressed air. It is also conceivable for them to be filled with other pressurized mediums such as nitrogen. For the purposes the present disclosure, vehicle tires can, for example, be tubed tires or tubeless tires. Vehicle tires are used, for example, in passenger vehicles, busses, and commercial vehicles, but are also used for example in aircraft.

Conventional vehicle tires are usually supplied via external connections with a pressurized medium, for example compressed air or a nitrogen filling. Usually, standardized valves are used for this purpose. Vehicle tires usually have an optimal operating pressure or inflation pressure which depends on the respective usage conditions or operating conditions. For land vehicles such as passenger cars, busses, or trucks, for example, there are operating pressures or pressure ranges that can ensure an optimum of rolling resistance, lateral guidance, longitudinal guidance, heat build-up, and/or wear behavior.

An existing actual pressure in a tire can, for example, fluctuate within certain limits along with the ambient temperature or operating temperature. Furthermore, over the long term, a certain amount of pressure loss, for example a so-called gradual pressure loss, is often impossible to avoid completely. There are known systems for vehicles that make it possible to monitor the operating pressure or inflation pressure in tires. These can be so-called active or passive systems. Passive systems can, for example, be embodied to determine rolling circumferences of the tires of an axle and compare them to one another. If this reveals significant differences, then this is an indication that there are pressure differences between the respective tires. Active systems for measuring and/or monitoring compressed air usually include sensors for pressure detection, which are integrated into a wheel unit. Pressure sensors of this kind can, for example, be embodied to transmit corresponding pressure signals wirelessly or by wire from the (rotating) tire to stationary components of the vehicle.

Furthermore, there are generally known systems that make it possible to independently adjust the inflation pressure of vehicle tires. Systems of this kind can be found, for example, in agricultural vehicles, military vehicles, or specialized vehicles of the like. The systems can basically be embodied to permit adjustment of the inflation pressure when the vehicle is at rest, i.e. when the vehicle is not moving. Known systems for independent pressure regulation in vehicles have a centralized structure. In other words, there is only one device for supplying the pressurized medium for inflating the tires. It is also conceivable to provide a small number of devices for supplying the pressurized medium, for example in a tractor/trailer combination. A central supply device of this kind for compressed air is nevertheless provided for inflating a plurality of wheel units, particularly on different axles or shafts. For this purpose, the central compressed air- or pressurized medium supply unit must be coupled to a plurality of wheel units. Usually, the supply unit is thus mounted to the frame, the chassis, or the body of the vehicle. The supply unit can, for example, include a compressor or air compressor. Leading from the supply unit, it is then necessary to route a plurality or a large number of compressed air lines or pressurized medium lines to the individual wheel units. In this case, it is usually necessary to provide a plurality of so-called rotary feed-throughs for the pressurized medium lines. This is necessitated by the fact that the tires of the wheel units are usually mounted in rotary fashion on axles of the vehicle.

By contrast with rotary transmission apparatuses, which are used to transmit control and/or working pressures and corresponding pressurized mediums from a stationary axle to a wheel unit that rotates relative to the axle, rotary transmission apparatuses for transmitting control and/or working pressures and for transmitting pressurized mediums to a rotating shaft, in particular a drive shaft, of a vehicle present special challenges because as a rule, there is only a particularly small amount of space available for accommodating and integrating such rotary transmission apparatuses. This is particularly true for drive shafts that are provided with a swivel head in order to be able to compensate for corresponding movements of a steering motion.

Usually, a rotary feed-through for transmitting control and/or working pressures and for transmitting pressurized mediums has a stator ring and a rotor ring, which are installed in annular fashion for example outside an axle body of the shaft. Up to now, a rotary feed-through inside the axle body has entailed a high production cost and considerable risks. This is true, for example, in land vehicles equipped with all-wheel drive and external planetary gears. A failure of the rotary feed-through inside the axle body would result in air penetrating into the axle housing and the oil of the differential could leak out from the transmission ventilation.

To increase the service life of rotary feed-throughs and the operational reliability of the tire pressure adjusting system, tire pressure adjusting systems are increasingly being equipped with special switching valves in the wheels, which only load the rotary feed-throughs with compressed air during the adjusting procedure. But with larger diameters and conventional seals, the service life of rotary feedthroughs must nevertheless be assessed very critically because as diameters increase, there is also a sharp increase not only of sliding speeds but also particularly of frictional torques.

In light of this situation, the object of the invention is to modify a rotary transmission apparatus of the type mentioned at the beginning i.e. a rotary transmission apparatus for transmitting control and/or working pressures or for transmitting pressurized mediums to a fluid duct which is received or configured at least in regions in the interior of a shaft, in particular a drive shaft such that it features a high durability and has the least possible effect on the vehicle when not in use. The rotary transmission apparatus should also feature low susceptibility to wear and a pronounced longevity.

This object is attained according to the invention by a rotary transmission apparatus according to the subject of the independent claims 1 and 3; advantageous modifications thereof are disclosed in the corresponding dependent claims.

Thus according to a first aspect, the invention particularly relates to a rotary transmission apparatus for transmitting control and/or working pressures or pressurized mediums to a fluid duct which is received or configured at least in regions in the interior of a shaft, in particular a drive shaft, the rotary transmission apparatus having a stator assembly which is arranged in a stationary manner with respect to a rotational movement of the shaft and has at least one fluid feed/discharge line and a control element which can be displaced in the shaft longitudinal direction relative to the shaft between a first position and a second position. In this case, according to the first aspect of the present invention, a flow connection between the at least one fluid feed/discharge line and the fluid duct is interrupted in the first position of the control element and a flow connection between the at least one fluid feed/discharge line and the fluid duct is established in the second position of the control element.

According to modifications of the rotary transmission apparatus according to the first aspect of the present invention, the stator assembly can have a seal arrangement which is assigned to the control element and has at least one seal, in particular in the form of a sealing lip, the at least one seal and/or a topology, i.e. surface configuration or formation, of the circumferential face of the shaft in the region of the stator assembly being configured in such a way that, in relation to the shaft, the at least one seal is at least substantially contact-free in the first position of the control element and the at least one seal is in contact with the shaft and at least substantially has a sealing action relative to it in the second position of the control element.

According to another (second) aspect, the object underlying the invention is attained by the subject of independent claim 3, which relates to a rotary transmission apparatus for the transmission of control and/or working pressures or corresponding pressurized mediums to a fluid duct which is received or configured at least in regions in the interior of a shaft, in particular a drive shaft, the rotary transmission apparatus having a stator assembly which is arranged in a stationary manner with respect to a rotational movement of the shaft and has at least one fluid feed/discharge line and a control element which can be displaced in the shaft longitudinal direction relative to the shaft between a first position and a second position, and a fluid space being configured between the control element and the circumference face of the shaft, which fluid space is configured in particular as an annular space. In the rotary transmission apparatus according to the second aspect of the invention, the stator assembly has a seal arrangement which is assigned to the control element and has at least one seal, in particular in the form of a sealing lip, the at least one seal and/or a topology (surface configuration or formation) of the circumferential face of the shaft in the region of the stator assembly being configured in such a way that, in relation to the shaft, the at least one seal is at least substantially contact-free (with regard to the shaft) in the first position of the control element and is in contact and at least substantially has a sealing action with regard to the shaft in the second position of the control element.

The rotary transmission apparatus according to the invention according to the first and second aspects first features the fact that it only occupies a small amount of space and second features an increased service life. In particular, it features the fact that when the rotary transmission apparatus is not in use, the control element or the at least one seal of the seal arrangement which is assigned to the control element does not come into contact with the drive shaft, which rotates or is rotatable relative to the stator assembly, and is therefore not subject to any wear.

In the rotary transmission apparatus according to the invention (first and additional aspect), a fluid space is preferably configured between the control element and the circumferential face of the shaft, which is advantageously embodied as an annular space that is particularly embodied or configured coaxially with respect to the shaft.

According to an embodiment of the rotary transmission apparatus according to the invention that particularly features a compact design, a fluid duct is configured in the control element, which fluid duct, at least in the second position of the control element, connects the at least one fluid feed/discharge line in flow terms, preferably continuously, to the fluid space which is configured, in particular, as an annular space.

It is also possible in this connection for at least one branch duct to be configured in the shaft, which branch duct connects the fluid duct which is received or configured in the interior of the shaft in flow terms to the fluid space which is configured, in particular, as an annular space.

In this connection, it is advantageous if the stator assembly as a whole is embodied as at least essentially rotationally symmetrical, it being primarily possible for the control element of the stator assembly to be configured as a control ring, which is configured coaxially with respect to the shaft longitudinal axis and encloses a partial region of the shaft in its interior in a sleeve-shaped fashion. The control element, which is in particular configured as a control ring configured coaxially with respect to the shaft longitudinal axis, can have a guide face which interacts with a guide face of a housing of the stator assembly and is mounted such that it can be displaced between the first and second position relative to the housing of the stator assembly and can be displaced relative to the shaft in the longitudinal direction of the shaft longitudinal axis.

According to preferred embodiments of the rotary transmission apparatus according to the invention, in the region of the stator assembly or in the region of the fluid spaced formed by the stator assembly and the control element of the stator assembly, the circumferential face of the shaft has a region which tapers conically in relation to the shaft longitudinal axis, where in the case of the displacement of the control element in the direction of its first position, the at least one seal assigned to the control element is also displaced in the feed direction of the conically tapering region.

According to embodiments of the rotary transmission apparatus according to the invention, the control element particularly has a front end region as viewed in the shaft longitudinal direction and an opposite rear end region, the front end region being assigned a first seal, in particular in the form of a sealing lip, and the rear end region being assigned a second seal, in particular in the form of a sealing lip, the first and second seal being connected to the control element in such a way that they are also moved in the case of a longitudinal displacement of the control element relative to the shaft, and, in the second position of the control element, the seals sealing the fluid space with respect to the circumferential face of the shaft, which fluid space is configured, in particular, as an annular space, whereas in the first position of the control element, the seals are contact-free in relation to the circumferential face of the shaft.

According to modifications of the above-mentioned embodiment of the rotary transmission apparatus according to the invention, in the region of the fluid space or in the region of the stator assembly, the circumferential face of the shaft can have a first region which tapers conically in relation to the shaft longitudinal axis and is assigned to the first seal, and a second region, which tapers conically in relation to the shaft longitudinal axis and is assigned to the second seal, the feed direction of the first and second conically tapering region corresponding in each case with the direction in which the control element moves when it is displaced in the direction of its first position.

But the present invention is not limited to those embodiments in which in the region of the fluid space or in the region of the stator assembly, the circumferential face of the shaft has at least a first region, which tapers conically in relation to the shaft longitudinal axis. Instead, alternatively or in addition to such a conically tapering region of the shaft, it is also conceivable that in the region of the stator assembly, the circumferential face of the shaft has at least one region which projects radially in relation to the shaft longitudinal axis and at least one region which is recessed radially in relation to the shaft longitudinal axis, the at least one seal and/or the at least one radially projecting region of the shaft circumferential face being configured in such a way that, in the second position of the control element, the at least one seal is in contact with the at least one radially projecting region, and the at least one seal and/or the at least one radially recessed region being configured in such a way that, in the first position of the control element, the at least one seal is present in the radially recessed region and preferably, an air gap is present between the at least one seal and the circumference face of the shaft.

For example, in the region of the fluid space, the circumference face of the shaft can have a first section which is assigned to the first seal and a second section which is assigned to the second seal, the first and second section in each case having a region which projects radially in relation to the shaft longitudinal axis and a region which is recessed radially in relation to the shaft longitudinal axis, the first and second seal being arranged in the radially recessed region of the respective circumferential face section of the shaft in the first position of the control element and in the radially projecting region of the respective circumferential face section of the shaft in the second position of the control element.

According to embodiments of the rotary transmission apparatus according to the invention, the at least one fluid feed/discharge line of the stator assembly is connected in flow terms to a control space which is delimited at least in regions by the control element and is configured in such a way that, in the case of (sufficient) pressure loading of the control space, the control element can be moved into its second position.

In this connection, it is conceivable that the control space which is connected in flow terms to the at least one fluid feed/discharge line is connected in flow terms to the fluid space (annular space) configured between the control element and the circumference face of the shaft. In this embodiment, the pressurized medium, which is to be conveyed in the fluid duct configured or received in the shaft, can therefore also be simultaneously used as a control medium for manipulating the control element.

According to a possible modification of the above-mentioned embodiments, a control line is provided, which is connected in flow terms to another (second) control space and which is different from the at least one fluid feed/discharge line. The other (second) control space is delimited at least in regions by the control element of the stator assembly and is configured in such a way that, in the case of pressure loading of the other (second) control space, the control element can be moved (back) into its first position. Alternatively or in addition to another (second) control space of this kind, however, it is also conceivable for the control element to be prestressed into its first position by means of a prestressing element, in particular a spring.

The invention also relates to a system with a rotary transmission apparatus of the above-described type according to the invention in which the system also has a shaft on which the rotary transmission apparatus is mounted, the shaft particularly being embodied as a drive shaft of a vehicle.

The invention also relates to a tire pressure adjusting system for at least one wheel, which is driven rotationally relative to a vehicle body, of a pneumatically wheeled vehicle having at least one drive shaft for driving the wheel, a fluid duct being received or configured in the interior of the drive shaft and at least one rotary transmission apparatus according of the above-described type according to the invention being provided for feeding and/or discharging a pressurized fluid as required to and from the fluid duct received or configured in the interior of the drive shaft.

An exemplary embodiment of a system with an exemplary embodiment of the rotary transmission apparatus according to the invention will be described in greater detail below with reference to the attached drawings.

In the drawings:

FIG. 2b shows a schematic sectional view along the line B-B in FIG. 2a;

FIG. 4b shows a schematic detail view of a region of the rotary transmission apparatus according to FIG. 4a;

FIG. 5b shows a schematic detail view of the rotary transmission apparatus according to FIG. 5a.

Figure 5A:
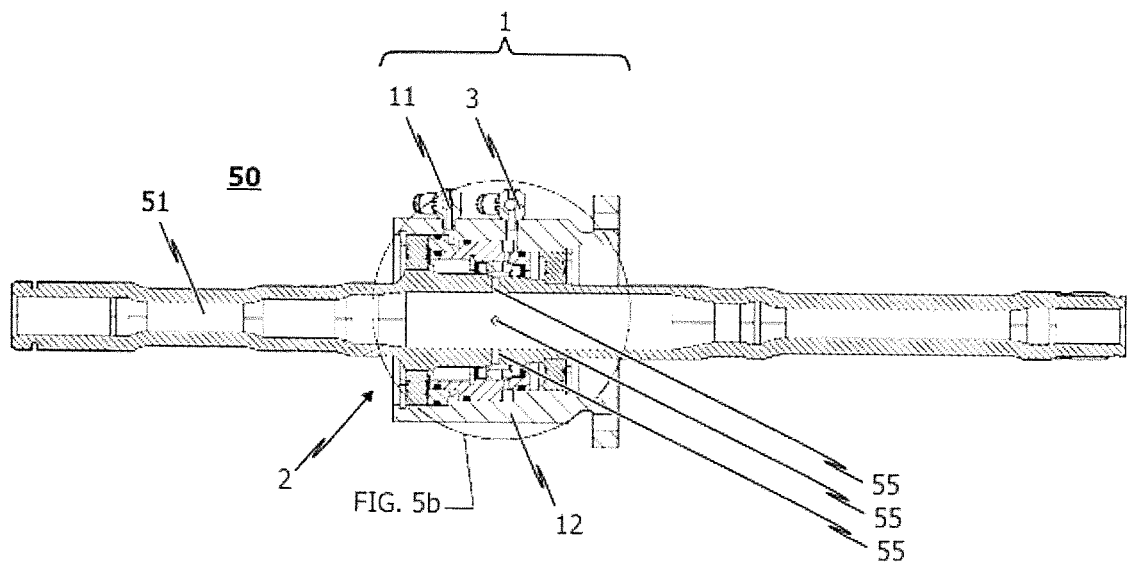
FIG. 5a shows a schematic sectional view of the drive shaft according to FIG. 4a with the rotary transmission apparatus in a second operating state in which a pressurized medium can be transmitted to the drive shaft.

In the following, with reference to the depictions in FIGS. 1 and 2a & b, an exemplary embodiment of a drive shaft 50 will first be described, which is provided with an embodiment of the rotary transmission apparatus 1 according to the invention. In this case, FIG. 2a and FIG. 2b each show the rotary transmission apparatus 1 in its first operating state in which no pressurized medium is being transmitted via the rotary transmission apparatus 1 to a fluid duct 51 that is received or configured in the drive shaft 50. Then the second operating state of the rotary transmission apparatus 1, in which pressurized medium can be transmitted via the rotary transmission apparatus 1 to the fluid duct 51 that is received or configured in the interior of the drive shaft 50, will be described with reference to the depictions in FIGS. 5a, 5b, and 5c.

Figure 1:
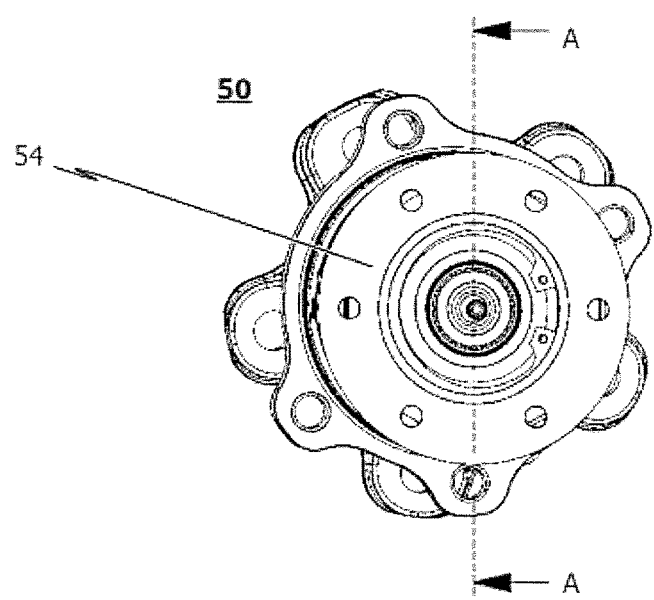
FIG. 1 shows a schematic top view of an exemplary embodiment of a (whole) drive shaft of a wheel drive for a steered and driven vehicle wheel.
Figure 2A:
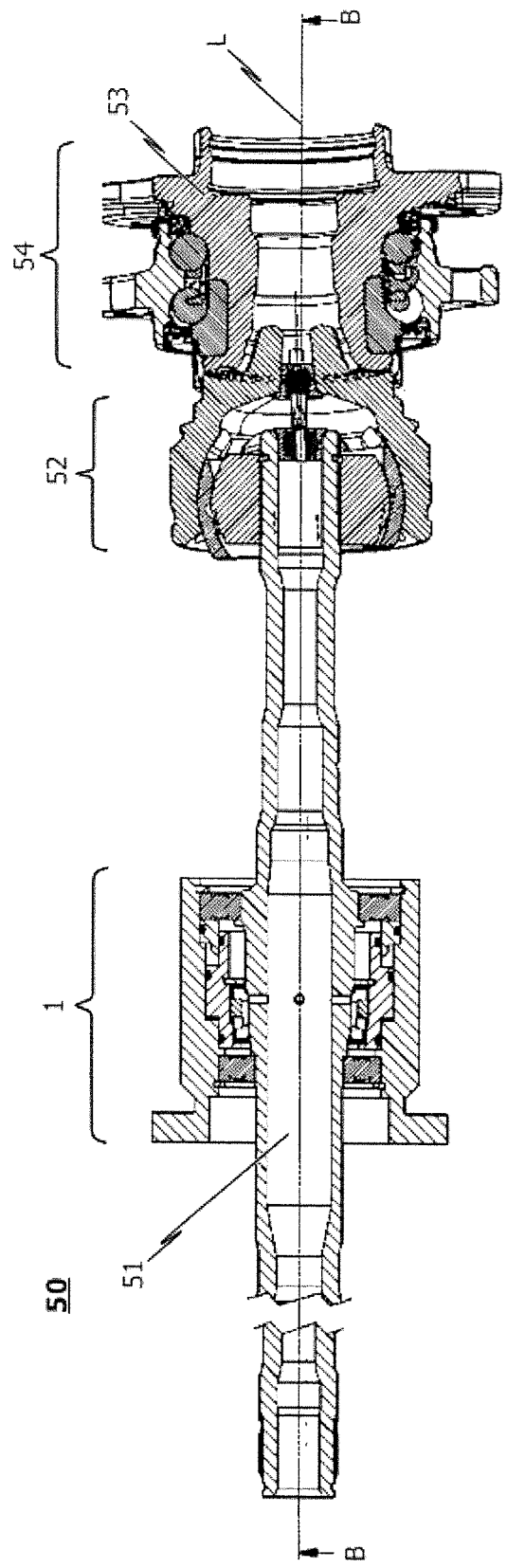
FIG. 2a shows a schematic sectional view along the line A-A in FIG. 1 of the exemplary embodiment of the drive shaft, with a rotary transmission apparatus assigned to the drive shaft in its first operating state in which no pressurized medium is being transmitted to the drive shaft.
Figure 2B:
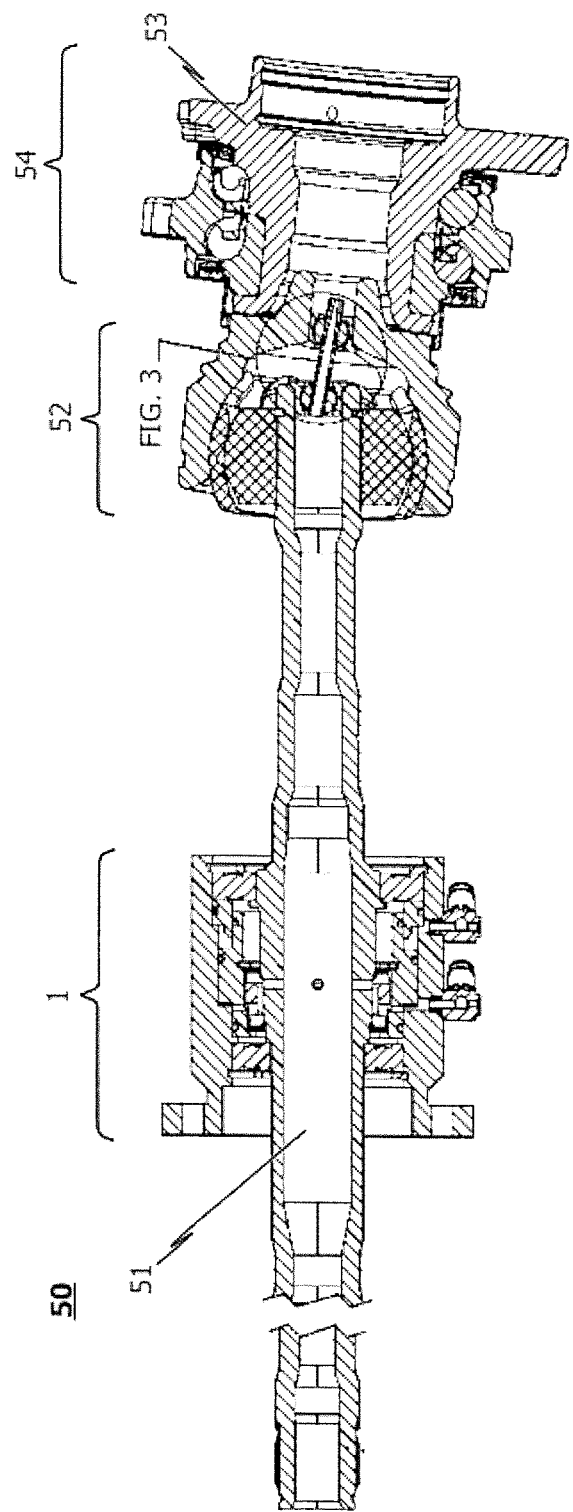
Figure 3:
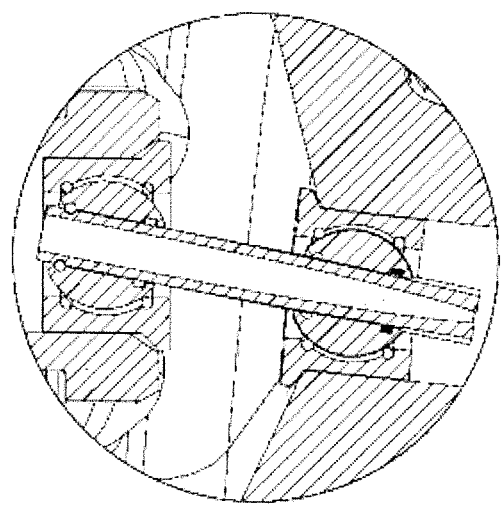
FIG. 3 shows a schematic detail view from FIG. 2b.

As shown in FIG. 1 and FIG. 2a and FIG. 2b, the drive shaft 50 is for example the drive shaft 50 of a wheel drive for a steered and driven vehicle wheel 54. The drive shaft 50 has a first shaft 53 oriented toward the wheel, a universal joint 52, and a second shaft oriented toward the axle. Since the steering axle of the wheel must be located as close to the wheel plane as possible in such a drive shaft 50 so that the scrub radius is as small as possible, a certain space problem exists with regard to the rotary transmission apparatus 1. Particularly in such drive shafts for a steered and driven vehicle wheel 54, there is thus a need to provide a particularly compactly designed rotary transmission apparatus 1, which in particular, is configured in a way that is as wear-free as possible.

The rotary transmission apparatus 1, which is shown together with the drive shaft 50 in FIG. 2a and FIG. 2b, can in particular be part of a tire pressure control system of a motor vehicle.

The rotary transmission apparatus 1 schematically depicted in FIG. 2a and FIG. 2b is mounted on the drive shaft 50 and in particular, is connected to the latter in a torque-engaged way. Although this is not shown, the drive shaft 50 can be enclosed by an axle housing at the end oriented toward the vehicle. In at least some regions, the axle housing can constitute the housing 12 of a stator assembly 2 of the rotary transmission apparatus 1.

The free segment of the drive shaft 50, i.e. end region of the drive shaft 50 oriented toward the wheel, is connected to the wheel unit 54 via the above-mentioned universal joint 52 and in the figurative sense, is used to fasten one or more wheels to the drive shaft 50 so that they can be driven by the drive shaft 50.

The design and function of the rotary transmission apparatus 1 will be described in greater detail below with reference to the depictions in FIG. 4a to FIG. 4c and FIG. 5a to FIG. 5c.

Figure 4A:
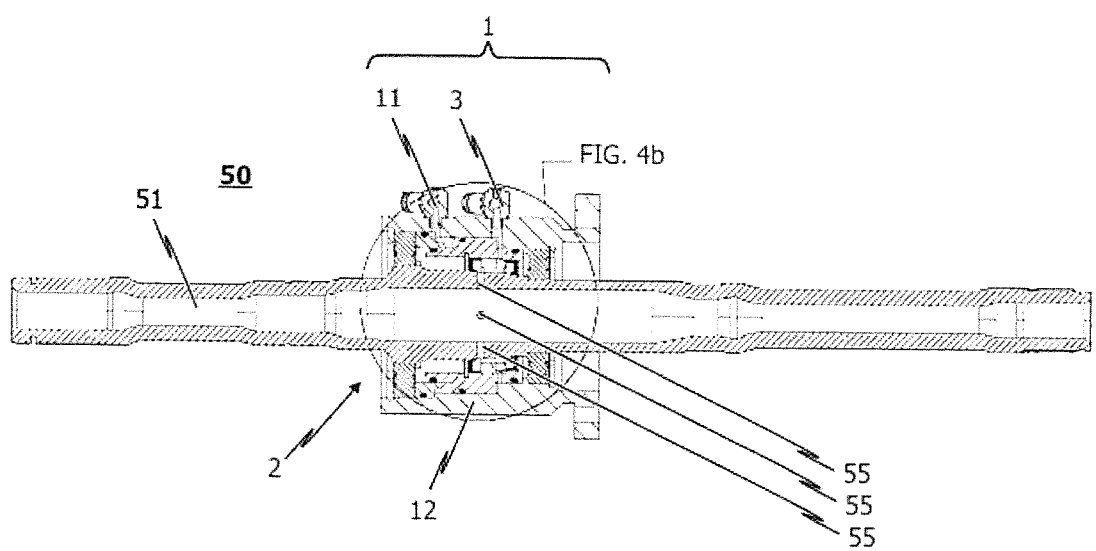
FIG. 4a shows a schematic sectional view through an exemplary embodiment of a drive shaft with a rotary transmission apparatus in its first operating state in which no pressurized medium is being transmitted to the drive shaft.
Figure 4B:
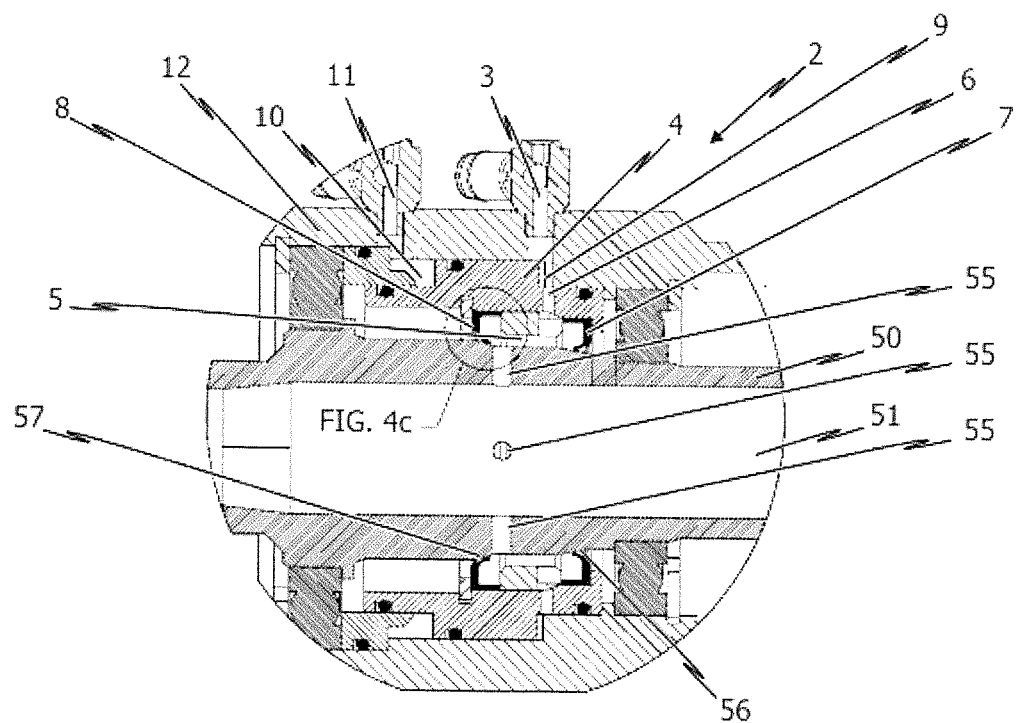

In detail, FIG. 4a and FIG. 4b show the exemplary embodiment of the rotary transmission apparatus 1 according to the invention in its first operating state in which no pressurized medium and no control- and/or working pressures are being transmitted via the rotary transmission apparatus 1 to a fluid duct 51 received or configured in the drive shaft 50. By contrast, particularly in FIG. 5a and FIG. 5b, the exemplary embodiment of the rotary transmission apparatus 1 according to the invention is shown in its second operating state in which a transmission of control- and/or working pressures or a transmission of a pressurized medium via the rotary transmission apparatus 1 to the fluid duct 51 received or configured in the interior of the drive shaft 50 are possible.

As shown in the drawings, in the exemplary embodiment of the rotary transmission apparatus 1, it has a stator assembly 2 which is arranged in a stationary manner with respect to a rotational movement of the shaft 50. The stator assembly 2 has a housing 12 (cage structure), which can, for example, be connected to an axle housing (not shown in the drawings).

The stator assembly 2, which is arranged in a stationary manner with respect to a rotational movement of the shaft 50, has a connection (fluid feed/discharge line 3) via which a pressurized medium can be fed to the stator assembly 2 as required. In this connection, it is naturally possible to provide a plurality of different fluid feed/discharge lines and corresponding connections for them, particularly in the housing 12 of the stator assembly 2. It is also possible for there to be other embodiments for feeding control and/or working pressures or pressurized mediums into the housing 12 of the stator assembly 2.

Figure 5B:
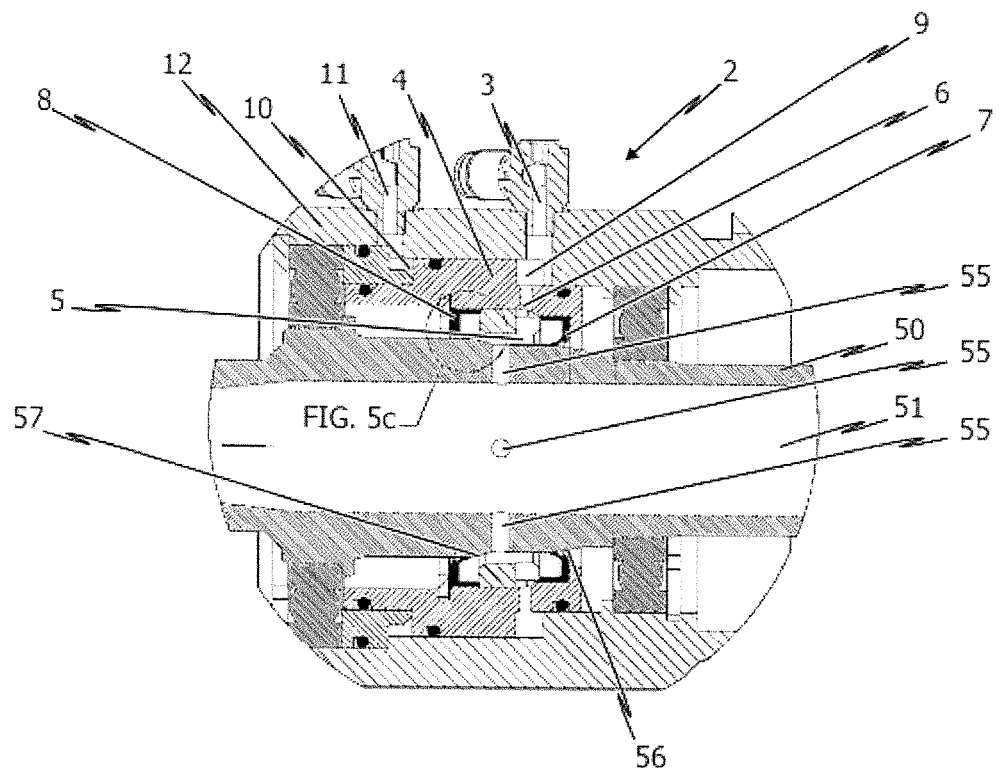

As can particularly be seen in the detail views according to FIG. 4b and FIG. 5b, in addition to the fluid feed/discharge line 3, a connection for a control line 11 to the stator assembly 2 is also provided.

The stator assembly 2 has a control element 4, which in the exemplary embodiment of the rotary transmission apparatus 1 according to the invention shown in the drawings, is configured as a control ring that is configured coaxially with respect to the shaft longitudinal axis L. This control element 4 (control ring) is in particular received so that it is supported in at least some regions in the housing 12 of the stator assembly 2 so that it is able to move in the shaft longitudinal direction L. In detail, the control element 4 is supported so that it is able to move between a first position shown in FIG. 4b and a second position shown in FIG. 5b relative to the drive shaft 50 (and likewise relative to the housing 12 of the stator assembly 2).

Although it is not provided in the embodiment shown in the drawings, the control element 4 can be configured in such a way that a flow connection between the fluid feed/discharge line 3 and the fluid duct 51 received or configured in the interior of the drive shaft 50 is interrupted in the first position of the control element (see FIG. 4b) whereas a flow connection between the at least one fluid feed/discharge line 3 and the fluid duct 51 received or configured in the interior of the drive shaft 50 is established in the second position of the control element (see FIG. 5b).

Figure 4C:
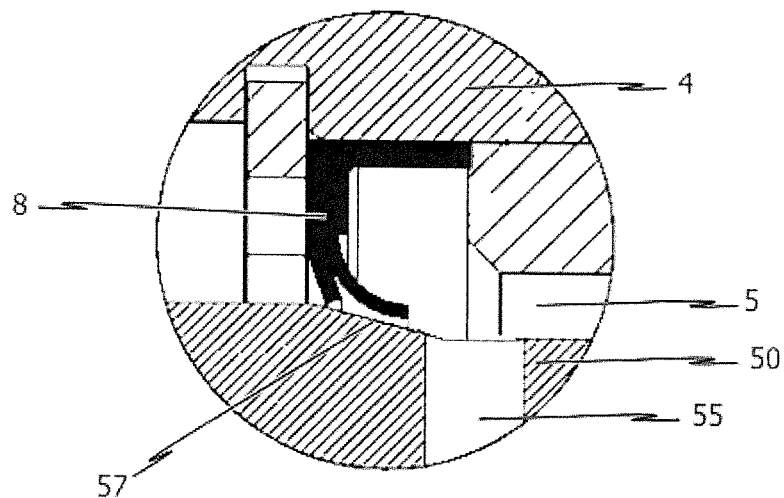
FIG. 4c shows a schematic detail view from FIG. 4b.
Figure 5C:
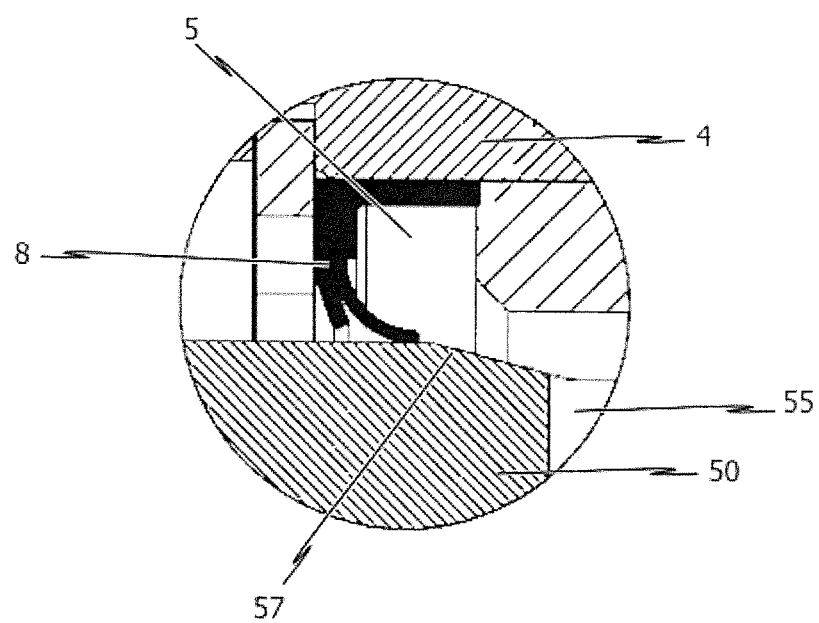
FIG. 5c shows a schematic detail view of FIG. 5b.

As can be seen in the depictions in FIGS. 4b and 5b and in the corresponding detail views according to FIGS. 4c and 5c, the stator assembly 2 also has a seal arrangement which is assigned to the control element 4 and has at least one seal 7, 8, in particular in the form of a sealing lip, the at least one seal 7,8 and/or a topology of the circumferential face of the drive shaft 50 in the region of the stator assembly 2 being configured in such a way that, in relation to the drive shaft 50, the at least one seal 7, 8 is at least substantially contact-free relative to the circumferential face of the drive shaft 50 in the first position of the control element (see FIG. 4b and FIG. 4c) and the at least one seal 7, 8 is in contact and at least substantially has a sealing action relative to the circumferential face of the drive shaft 50 in the second position of the control element (see FIG. 5b and FIG. 5c).

In detail, in the rotary transmission apparatus 1 shown in the drawings, the control element 4 has front end region as viewed in the shaft longitudinal direction L and an opposite rear end region, the front end region being assigned a first seal 7, in particular in the form of a sealing lip, and the rear end region being assigned a second seal 8, in particular in the form of a sealing lip. In this case, the first and second seal 7, 8 are connected to the control element 4 in such a way that they are also moved in the case of a longitudinal displacement of the control element 4 relative to the drive shaft 50. In the second position of the control element (see FIG. 5b and FIG. 5c), the seals 7, 8 seal a fluid space 5 with respect to the circumferential face of the drive shaft 50, which fluid space 5 is configured, in particular, as an annular space, whereas in the first position of the control element (see FIGS. 4b and 4c), the seals 7, 8 are contact-free or at least substantially contact-free in relation to the circumferential face of the drive shaft 50.

As can also be seen in the detail views in FIG. 4b and in FIG. 5b, the control element 4, which is particularly configured as a control ring which is configured coaxially with respect to the shaft longitudinal axis L, has a guide face which interacts with a guide face of a housing of the stator assembly 2 and is mounted such that it can be displaced between the first and second position relative to the housing 12 of the stator assembly 2 and can be displaced relative to the drive shaft 50 in the longitudinal direction of the shaft longitudinal axis L.

As can also be seen in the detail views in FIG. 4b and FIG. 5b, between the control element 4 and the circumference face of the drive shaft 50, an in particular annular fluid space 5 is formed, at least one fluid duct 6 being configured in the control element 4, which fluid duct 6, at least in the second position of the control element 4 (see FIG. 5b), connects the at least one fluid feed/discharge line 3 in flow terms to the fluid space 5, which is configured, in particular, as an annular space.

As can be seen in the detail views in in FIG. 4c and FIG. 5c, in the region of the fluid space 5, the circumferential face of the drive shaft 50 has at least one region 56, 57 which tapers conically in relation to the shaft longitudinal axis L, where in the case of the displacement of the control element 4 in the direction of its first position, the at least one seal 7, 8 is also displaced in the feed direction of the conically tapering region 56, 57.

In detail, the views according to FIG. 4b and FIG. 5b particularly show that in the region of the fluid space 5, the circumferential face of the drive shaft 50 has a first region 56, which tapers conically in relation to the shaft longitudinal axis L and is assigned to the first seal 7, and a second region 57, which tapers conically in relation to the shaft longitudinal axis L and is assigned to the second seal 8. In this case, the feed direction of the first and second conically tapering region 56, 57 corresponds in each case with the direction in which the control element 4 moves when it is displaced in the direction of its first position.

However, the invention is not limited to embodiments in which the topology of the circumference face of the drive shaft 50 has corresponding conically tapering regions 56, 57 as shown by way of example in the drawings. Instead, it is basically conceivable that in the region of the fluid space 5, the circumference face of the drive shaft 50 has a first section which is assigned to the first seal 7 and a second section which is assigned to the second seal 8, the first and second section in each case having a region which projects radially in relation to the shaft longitudinal axis L and a region which is recessed radially in relation to the shaft longitudinal axis L, the first and second seal 7, 8 being arranged in the radially recessed region of the respective circumferential face section of the drive shaft 50 in the first position of the control element 4 and in the radially projecting region of the respective circumferential face section of the drive shaft 50 in the second position of the control element 4.

As indicated above, the fluid feed/discharge line 3 of the stator assembly 2 is connected in flow terms to a control space 9 which is delimited at least in regions by the control element 4 and is configured in such a way that, in the case of pressure loading of the control space 9, the control element 4 can be moved into its second position.

Also in the exemplary embodiment of the rotary transmission apparatus 1 according to the invention shown by way of example in the drawings, another control line 11 is used, which is connected in flow terms to another (second) control space 10, this other (second) control space 10 being delimited at least in regions by the control element 4 and configured in such a way that, in the case of pressure loading of the other (second) control space 10, the control element 4 can be moved into its first position.

In the exemplary embodiment shown in the drawings, the control space 9 which is connected in flow terms to the fluid feed/discharge line 3 (first control space) is connected in flow terms to the fluid space 5 configured between the control element 4 and the circumference face of the drive shaft 50 via a fluid duct 51 configured in the control element 4.

Summarized briefly, the exemplary embodiment of the rotary transmission apparatus 1 according to the invention shown in the drawings can be characterized as follows:

In order, during operation of the rotary transmission apparatus 1, to reduce the wear and friction losses to a minimum, the rotary transmission apparatus 1 is configured in such a way that only for the time period of a transmission of the pressurized medium to the fluid duct 51 configured in the drive shaft 50 do the corresponding sealing elements 7, 8 (sealing lips) of the sealing arrangement assigned to the control element 4 engage or come into contact with the drive shaft 50, which is rotating relative to the stator assembly 2.

The drive shaft 50, which is configured, for example, as a hollow shaft or partially hollow shaft, can have an arbitrary number of ducts. Each duct of the drive shaft 50 extending parallel to the rotation axis of the drive shaft 50 has an arbitrary number of branch ducts 55 to the drive shaft surface and all of the branch ducts 55 that are located in the region of the stator assembly 2 "see" the same control pressure. The outer contour (topology) of the drive shaft 50 is configured so that in the region of the transmission, the drive shaft 50 has sealing sections in relation to the rotation axis. A sealing section is a section of the longitudinal axis of the drive shaft 50 that is delimited by two seals 7, 8, in particular sealing lips, or by rotationally symmetrical accumulations of material.

The above-described exemplary embodiment relates to a two-duct rotary feed-through comprising a working duct and a control duct. It can likewise be embodied with a single duct or also with more than two ducts.

The description of the invention makes it clear that the rotary transmission apparatus 1 according to the invention is also primarily suitable for retrofitting.

The invention is not limited to the embodiment shown in the drawings, but instead ensues from a consideration of all of the features disclosed herein.

What is claimed is:

1. A rotary transmission apparatus for the transmission of a control pressure and/or working pressure to a fluid duct that is received or configured at least in regions in an interior of a shaft, the rotary transmission apparatus comprising:

a stator assembly that is arranged in a stationary manner with respect to a rotational movement of the shaft and has at least one fluid feed/discharge line and a control element that can be displaced in a shaft longitudinal direction (L) relative to the shaft between a first position and a second position, a fluid space, in the form of an annular space, between the control element and a circumferential face of the shaft, a flow connection between the at least one fluid feed/discharge line and the fluid duct being interrupted in the first position of the control element, and a flow connection between the at least one fluid feed/discharge line and the fluid duct established in the second position of the control element, wherein the fluid duct is configured in the control element to connect the at least one fluid feed/discharge line in flow terms to the fluid space when in the second position.

2. The rotary transmission apparatus according to claim 1, the stator assembly further comprising a seal arrangement that is assigned to the control element and has at least one seal in the form of a sealing lip, the at least one seal and/or a topology of the circumferential face of the shaft in the region of the stator assembly being configured such that, in relation to the shaft, the at least one seal is at least substantially contact-free in the first position of the control element and is in contact and at least substantially has a sealing action in the second position of the control element.

3. The rotary transmission apparatus according to claim 1, wherein the control element is configured as a control ring which is configured coaxially with respect to a shaft longitudinal axis, and includes a guide face which interacts with a guide face of a housing of the stator assembly, and is mounted such that it can be displaced between the first and second position relative to the housing of the stator assembly and in the longitudinal direction (L) of the shaft longitudinal axis relative to the shaft.

4. The rotary transmission apparatus according to claim 1, the circumferential face of the shaft having, in the region of the stator assembly, at least one region which projects radially in relation to the shaft longitudinal axis (L) and at least one region which is recessed radially in relation to the shaft longitudinal axis (L), at least one seal and/or the at least one radially projecting region of the shaft circumferential face being configured in such that, in the second position of the control element, the at least one seal is in contact with the at least one radially projecting region, and the at least one seal and/or the at least one radially recessed region being configured in such that, in the first position of the control element, the at least one seal is present in the radially recessed region.

5. The rotary transmission apparatus according to claim 1, the at least one fluid feed/discharge line being connected in flow terms to a control space which is delimited at least in regions by the control element and is configured in such that, in the case of pressure loading of the control space, the control element can be moved into its second position, a control line which is connected in flow terms to a further control space being provided, the further control space being delimited at least in regions by the control element and being configured in such that, in the case of pressure loading of the further control space, the control element can be moved into its first position.

6. The rotary transmission apparatus according to claim 5, the control space which is connected in flow terms to the at least one fluid feed/discharge line being connected in flow terms via a fluid duct which is configured in the control element to the fluid space which is configured between the control element and the circumferential face of the shaft.

7. The rotary transmission apparatus according to claim 1, further comprising at least one branch duct being configured in the shaft, which branch duct connects the fluid duct which is received or configured in the interior of the shaft in flow terms to the fluid space which is configured as an annular space.

8. A system having a rotary transmission apparatus according to claim 1 and a drive shaft on which the rotary transmission apparatus is mounted, wherein the drive shaft is configured for use with a vehicle.

9. A tire pressure adjusting system for at least one wheel, driven rotationally relative to a vehicle body, of a pneumatically wheeled vehicle having a drive shaft for driving the wheel, a second fluid duct being received or configured in the interior of the drive shaft, and at least one rotary transmission apparatus according to claim 1 being provided for feeding and/or discharging a pressurized fluid to or from the second fluid duct.

10. A rotary transmission apparatus for the transmission of a control pressure and/or working pressure to a fluid duct that is received or configured at least in regions in an interior of a shaft, the rotary transmission apparatus comprising:

a stator assembly which is arranged in a stationary manner with respect to a rotational movement of the shaft and has at least one fluid feed/discharge line and a control element that can be displaced in the shaft longitudinal direction (L) relative to the shaft between a first position and a second position, a fluid space that is configured as an annular space between the control element and a circumferential face of the shaft, the stator assembly having a seal arrangement which is assigned to the control element and has at least one seal in the form of a sealing lip, the at least one seal and/or a topology of the circumferential face of the shaft in the region of the stator assembly being configured such that, in relation to the shaft, the at least one seal is at least substantially contact free in the first position of the control element and is in contact and at least substantially has a sealing action in the second position of the control element.

11. The rotary transmission apparatus according to claim 10, further comprising at least one branch duct being configured in the shaft, which branch duct connects the fluid duct which is received or configured in the interior of the shaft in flow terms to the fluid space that is configured as an annular space.

12. The rotary transmission apparatus according to claim 10, wherein the circumferential face of the shaft having, in the region of the fluid space, at least one region which tapers conically in relation to a shaft longitudinal axis (L), the at least one seal also being displaced in the feed direction of the conically tapering region in the case of the displacement of the control element in the direction of its first position.

13. The rotary transmission apparatus according to claim 10, the circumferential face of the shaft having, in the region of the stator assembly, at least one region which projects radially in relation to a shaft longitudinal axis (L) and at least one region which is recessed radially in relation to the shaft longitudinal axis (L), the at least one seal and/or the at least one radially projecting region of the shaft circumferential face being configured in such that, in the second position of the control element, the at least one seal is in contact with the at least one radially projecting region, and the at least one seal and/or the at least one radially recessed region being configured in such that, in the first position of the control element, the at least one seal is present in the radially recessed region.

14. A rotary transmission apparatus for the transmission of a control pressure and/or working pressure to a fluid duct that is received or configured at least in regions in an interior of a shaft, the rotary transmission apparatus comprising:

a stator assembly that is arranged in a stationary manner with respect to a rotational movement of the shaft and has at least one fluid feed/discharge line and a control element that can be displaced in a shaft longitudinal direction (L) relative to the shaft between a first position and a second position, a flow connection between the at least one fluid feed/discharge line and the fluid duct being interrupted in the first position of the control element, and a flow connection between the at least one fluid feed/discharge line and the fluid duct established in the second position of the control element, wherein the control element includes a front end region as viewed in the shaft longitudinal direction (L) and an opposite rear end region, the front end region being assigned a first seal in the form of a sealing lip, and the rear end region being assigned a second seal in the form of a sealing lip, the first and second seal being connected to the control element in such that they are also moved in the case of a longitudinal displacement of the control element relative to the shaft, and, in the second position of the control element, the seals sealing a fluid space with respect to a circumferential face of the shaft, which fluid space is configured as an annular space, whereas, in the first position of the control element, the seals are contact-free or at least substantially contact-free in relation to the circumferential face of the shaft.

15. The rotary transmission apparatus according to claim 14, the circumferential face of the shaft having, in the region of the fluid space, a first region which tapers conically in relation to a shaft longitudinal axis (L) and is assigned to the first seal, and a second region which tapers conically in relation to the shaft longitudinal axis (L) and is assigned to the second seal, the feed direction of the first and second conically tapering region corresponding in each case with the direction in which the control element moves when it is displaced in the direction of its first position.

16. The rotary transmission apparatus according to claim 14, the circumferential face of the shaft having, in the region of the or a fluid space which is configured between the control element and the circumferential face of the shaft, a first section which is assigned to the first seal and a second section which is assigned to the second seal, the first and second section in each case having a region which projects radially in relation to the shaft longitudinal axis (L) and a region which is recessed radially in relation to the shaft longitudinal axis (L), the first and second seal being arranged in the radially recessed region of the respective circumferential face section of the shaft in the first position of the control element and in the radially projecting region of the respective circumferential face section of the shaft in the second position of the control element.

17. The rotary transmission apparatus according to claim 14, further comprising at least one branch duct being configured in the shaft, which branch duct connects the fluid duct which is received or configured in the interior of the shaft in flow terms to the fluid space which is configured as an annular space.

18. The rotary transmission apparatus according to claim 14, the circumferential face of the shaft having, in the region of the stator assembly, at least one region which projects radially in relation to a shaft longitudinal axis (L) and at least one region which is recessed radially in relation to the shaft longitudinal axis (L), at least one seal and/or at least one radially projecting region of the shaft circumferential face being configured in such that, in the second position of the control element, the at least one seal is in contact with the at least one radially projecting region, and the at least one seal and/or the at least one radially recessed region being configured in such that, in the first position of the control element, the at least one seal is present in the radially recessed region.

* * * * *